United States Patent
Hodinot et al.

(10) Patent No.: US 6,988,356 B2
(45) Date of Patent: Jan. 24, 2006

(54) FUEL METERING UNIT WITH A COMPENSATED REGULATOR VALVE IN A TURBOMACHINE

(75) Inventors: Laurent Hodinot, Cesson (FR); Henry Leclerc, Jusivy sur Orge (FR); Sylvain Poitout, Vincennes (FR)

(73) Assignee: Hispano Suiza, Colombes (FR)

( * ) Notice: Subject to any disclaimer, the term of this patent is extended or adjusted under 35 U.S.C. 154(b) by 155 days.

(21) Appl. No.: 10/692,796

(22) Filed: Oct. 27, 2003

(65) Prior Publication Data

US 2004/0083711 A1    May 6, 2004

(30) Foreign Application Priority Data

Oct. 30, 2002    (FR) .................................. 02 13619

(51) Int. Cl.
*F02C 9/28*    (2006.01)

(52) U.S. Cl. ..................................... 60/39.281; 60/734
(58) Field of Classification Search ............. 60/39.281, 60/734
See application file for complete search history.

(56) References Cited

U.S. PATENT DOCUMENTS

| 4,493,187 | A | | 1/1985 | Hansen |
| 4,817,376 | A | | 4/1989 | Brocard et al. |
| 5,715,674 | A | * | 2/1998 | Reuter et al. ............. 60/39.281 |
| 5,896,737 | A | * | 4/1999 | Dyer ........................ 60/39.281 |
| 6,321,527 | B1 | * | 11/2001 | Dyer et al. .............. 60/39.281 |
| 6,328,056 | B1 | | 12/2001 | Kumar et al. |
| 2001/0022079 | A1 | | 9/2001 | Blot-Carretero et al. |

FOREIGN PATENT DOCUMENTS

WO    WO 99/35385    7/1999

* cited by examiner

*Primary Examiner*—Louis J. Casaregola
(74) *Attorney, Agent, or Firm*—Oblon, Spivak, McClelland, Maier & Neustadt, P.C.

(57) ABSTRACT

A fuel metering unit in a turbomachine is connected between a high pressure pump which draws fuel from a fuel tank and a plurality of fuel injectors disposed in a combustion chamber of the turbomachine, the unit comprises a meter which receives the fuel for injection from a regulator valve at a pressure P1 and delivers it at a pressure P2 to said plurality of injectors via a stop valve, said regulator valve serving to recirculate fuel back to said high pressure pump as a function of the pressure difference between pressures taken directly from the terminals of the meter and injected into two end inlets of the regulator valve.

7 Claims, 4 Drawing Sheets

FUEL METERING UNIT WITH A COMPENSATED REGULATOR VALVE IN A TURBOMACHINE

FIELD OF THE INVENTION

The present invention relates in general to systems for injecting fuel in turbomachines, and it relates more particularly to a highly accurate fuel metering unit.

PRIOR ART

A conventional system for injecting fuel into a turbomachine is shown diagrammatically in FIG. 6. It is organized around a fuel metering unit 10 having an inlet duct 12 connected to the outlet of a high pressure pump 14 which draws fuel from a fuel tank (arrow 16) and which has an outlet duct 18 connected to a plurality of fuel injectors disposed in a turbomachine combustion chamber (arrow 20).

The metering unit which controls the flow rate of fuel that is to flow into the injectors from the high pressure pump itself comprises a meter 22 which receives the fuel to be injected from a regulator valve 24 at a pressure P1, and delivers the fuel at a pressure P2 to the injectors via a stop valve 26. Attempts are made to keep the pressure difference P2–P1 across the terminals of the meter constant by means of a differential pressure detector 28 connected to its terminals and acting on the opening of the regulator valve so that when the pressure at the inlet to the meter increases (or conversely decreases) relative to the pressure at its outlet, the detector actuates the regulator valve so as to increase (or conversely decrease) the flow rate of fuel that is returned to the pump via a return duct 30, thereby decreasing (or conversely increasing) the flow rate of fuel delivered to the meter.

That metering unit generally gives satisfaction. Nevertheless, in aviation applications, it still presents significant weight and high cost, and both its reliability and its metering accuracy could be improved.

OBJECT AND DEFINITION OF THE INVENTION

Thus, an object of the present invention is to provide an improved fuel metering unit, i.e. a unit of reduced weight and cost. Another object of the invention is to increase the reliability of the metering unit made in this way, in particular in order to reduce repair and preventative maintenance costs. Another object of the invention is also to increase the accuracy with which fuel is metered compared with prior art units.

These objects are achieved by a fuel metering unit in a turbomachine, the unit being mounted between a high pressure pump which draws fuel from a fuel tank and a plurality of fuel injectors for injecting the fuel into a turbomachine combustion chamber, the unit comprising a meter which has an inlet receiving fuel for injection from a regulator valve at a pressure P1 and has an outlet which delivers the fuel at a pressure P2 to said plurality of injectors via a stop valve, said regulator valve comprising a hydraulic slide movable in a sheath under drive from the pressures P1 and P2 taken directly from the terminals of the meter and acting on two end inlets of said regulator valve on respective sectional areas S1 and S2 of the hydraulic slide, said slide having a first annular neck for allowing fuel to recirculate to said high pressure pump by putting a first feed inlet of said sheath connected to an outlet of said high pressure pump into communication with a feed outlet of said sheath connected to an inlet of said high pressure pump, wherein said hydraulic slide further includes a second annular neck for providing another recirculation path to said high pressure pump by putting a second feed inlet of said sheath connected to said inlet of the meter into communication with an auxiliary feed outlet of said sheath connected to said inlet of the high pressure pump.

Thus, with this configuration having no differential pressure detector, a metering unit is obtained that is more compact, less expensive, and provides good metering accuracy. In addition, parasitic mechanical and hydraulic phenomena are compensated.

In order to provide additional control over the metering relationship, said second feed inlet is preferably connected to said meter inlet via a fixed diaphragm. The fixed diaphragm may be implemented as an orifice pierced through said sheath or may be made outside said regulator valve.

The auxiliary feed outlet is connected to said inlet of the high pressure pump via a variable diaphragm which may comprise a plurality of orifices of identical shapes (preferably made by electroerosion) distributed in equidistant manner around said sheath through which they are pierced, and offset from one another in a travel direction of said regulator valve. Advantageously, said orifices are of a section selected from the following sections: circular; rectangular; triangular; and oblong.

The invention also provides a high precision compensated regulator valve implemented in the above-specified metering unit.

BRIEF DESCRIPTION OF THE DRAWINGS

The characteristics and advantages of the present invention appear better from the following description made by way of non-limiting indication and with reference to the accompanying drawings, in which.

DETAILED DESCRIPTION OF A PREFERRED EMBODIMENT

Figure 1:
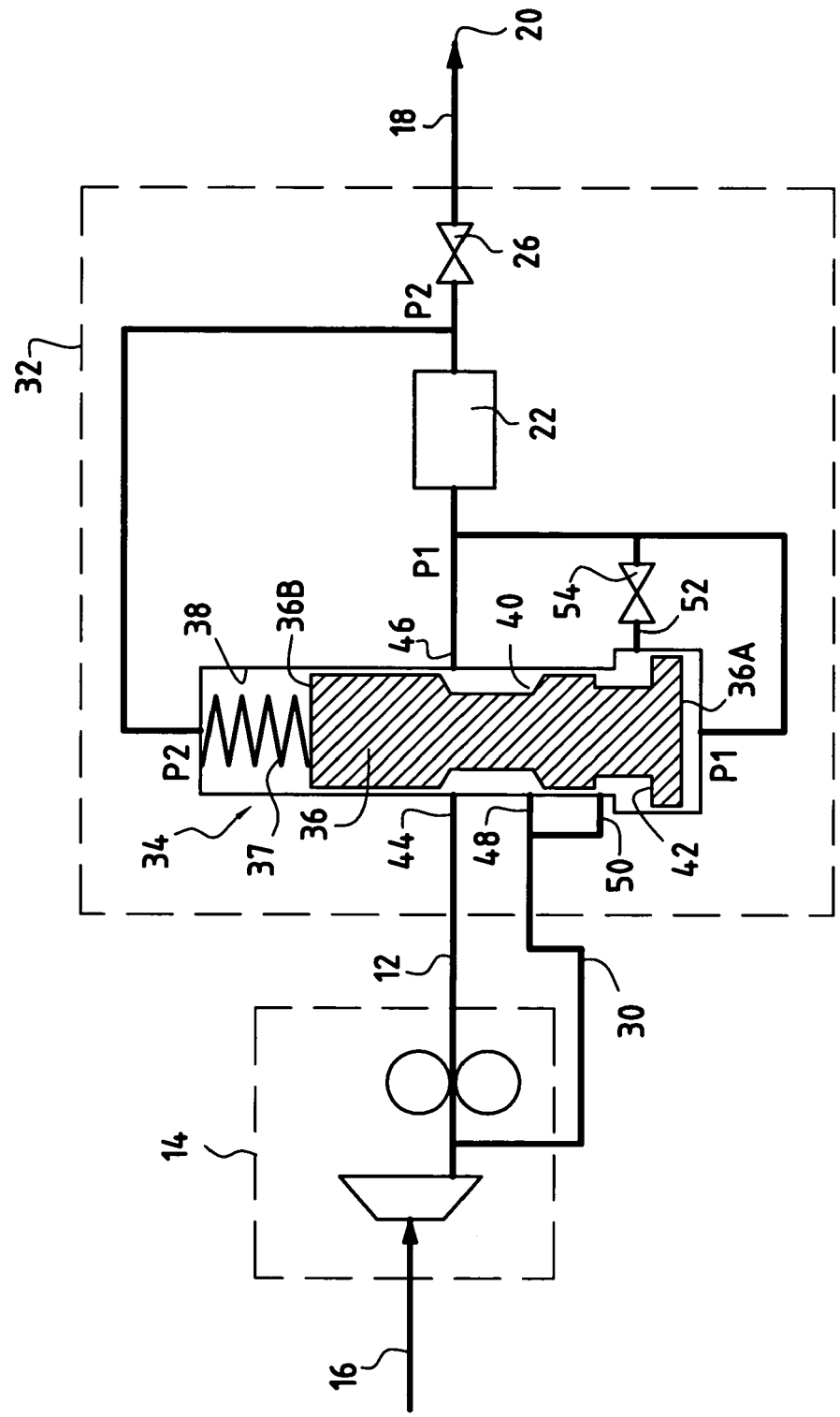
FIG. 1 is a diagrammatic view of a fuel injection system including a fuel metering unit of the present invention.

A turbomachine fuel injection system of the invention is shown diagrammatically in FIG. 1.

As in the prior art structure, there can be seen a high pressure fuel pump 14 which draws fuel from a fuel tank 16 to feed it via a fuel metering unit 32 to injectors 20 of a turbomachine combustion chamber.

Nevertheless, in the invention, the metering unit no longer includes a differential pressure detector (AP detector) but only the meter 22, the stop valve 26, and a compensated regulator valve 34 that also regulates pressure difference across the terminals of the meter while simultaneously compensating parasitic mechanical and hydraulic phenomena. This improved metering unit 32 is thus of reduced weight (made lighter by the omission of the AP detector) and is thus also of reduced cost, while being associated with better metering accuracy.

The regulator valve 34 comprises a hydraulic slide 36 capable of moving against a spring 37 in a sheath 38 under the action of pressure forces acting at its two ends 36A and 36B of respective cross-sectional areas S1 and S2 connected respectively to the inlet (pressure P1) and the outlet (pressure P2) of the meter 22. The hydraulic slide has two annular necks 40, 42. A first feed inlet 44 pierced through the sheath 38 is connected to the inlet duct 12 and a first feed outlet 46, also pierced through the sheath, is connected to the inlet of the meter 22. A groove 45 in the sheath 38 provides a continuous connection between the inlet 44 and the outlet 46 to feed the meter with fuel. The first neck 40 serves to allow excess fuel flow to flow back towards the pump via a second feed outlet 48 pierced though the sheath. The second neck 42 provides communication between an auxiliary feed outlet 50 pierced through the sheath 38 and connected via a diaphragm of gain Kb (variable depending on the position of the valve) to the pump return duct 30 (at pressure Pb) and a second feed inlet 52 also pierced through the sheath and connected to the inlet of the meter 22 (at pressure P1) via a fixed diaphragm 54 of gain K1. As shown, this fixed diaphragm may be made outside the regulator valve 32 or it may be pierced directly through the sheath 38.

This particular configuration of the slide 36 makes it possible to exert on the section difference S1–S2 a modulated pressure (Pm) between the pressure P1 and the pump return pressure Pb that varies as a function of the position of the valve. The meter pressure difference (ΔP) is determined by the spring force (F0) by the following relationship:

$$\Delta P \times \text{slide section} - F0 = 0$$

and is therefore theoretically constant. In practice, the stiffness of the spring (R) and the reaction forces acting on the slide disturb this ideal equilibrium by causing the position of the valve to vary (Xvalve), thereby modifying the meter pressure difference ΔP. It is in order to overcome these parasitic mechanical and hydraulic phenomena and to compensate for this change in the position of the valve that the pressure Pm has been introduced and it is dimensioned so that:

$$(P1-Pm)(S1-S2) = R \times X\text{valve} + F\text{reaction}$$

The equation for equilibrium thus becomes $$\Delta P \times S2 + (P1-Pm)(S1-S2) - F0 - R \times X\text{valve} - F\text{reaction} = 0$$

The modulated pressure is obtained by a hydraulic potentiometer comprising a fixed diaphragm (of gain K1) fed at P1, and a diaphragm that is variable as a function of the position of the valve (of gain Kb) and fed at Pb. Under stabilized conditions, Pm is given by the following equation:

$$Pm = K1^2 \times P1/(K1^2 + Kb^2) + Kb^2 \times Pb/(K1^2 + Kb^2)$$

Figure 2A:
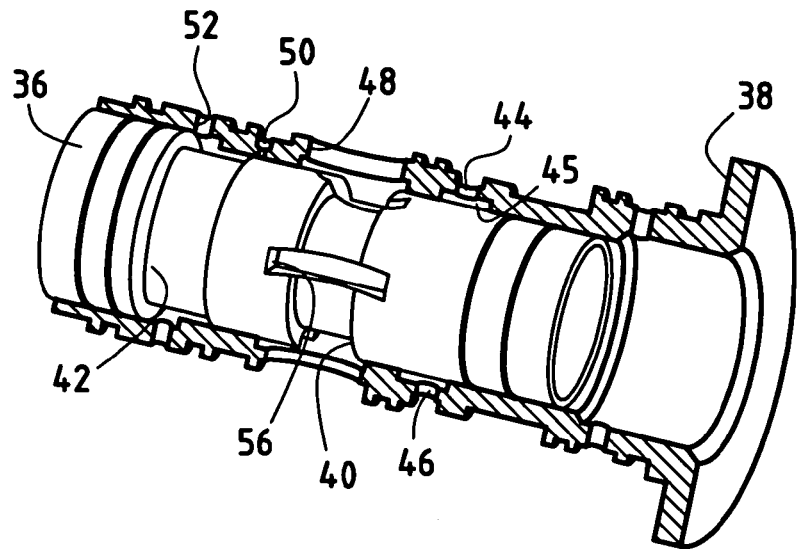
FIGS. 2A and 2B are respectively a perspective view and a longitudinal section view of a regulator valve of the FIG. 1 fuel metering unit.
Figure 2B:
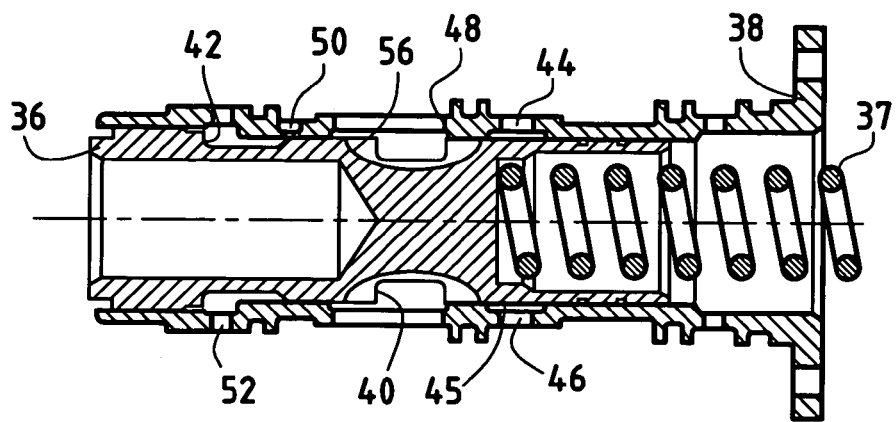

FIGS. 2A and 2B are diagrams in the form of a partially exploded perspective view and a longitudinal section showing the regulator valve 34. It can be seen that the hydraulic slide 36 is free to slide in its sheath 38 and has two annular necks 40, 42, the first neck 40 also being provided with four slots 56 distributed uniformly around the slide and through which the fuel passes initially. There can also be seen the various inlets 44, 52 and outlets 46, 48, 50 for feeding fuel, which inlets and outlets are pierced through the sheath substantially in register with the annular necks. More particularly, the auxiliary feed outlet 50, which acts as a variable diaphragm, is made up of a plurality of orifices of identical shapes distributed in equidistant manner around the sheath through which they are pierced, and offset from one another in the longitudinal travel direction of the valve.

These orifices are advantageously made by electroerosion or by drilling, with the slots being possibly obtained more conventionally by milling.

Figure 3A:
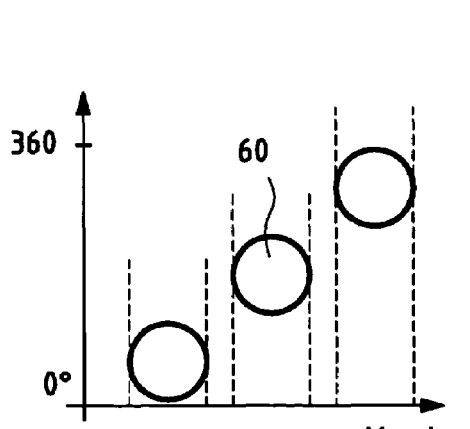
FIGS. 3A to 5B are charts showing different possible diaphragm shapes together with the corresponding compensation relationship for the FIG. 2A regulator valve.
Figure 3B:
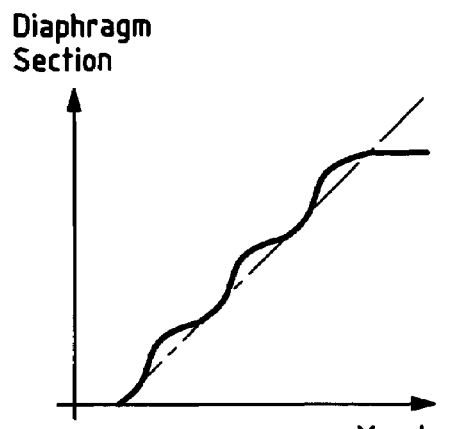
Figure 4A:
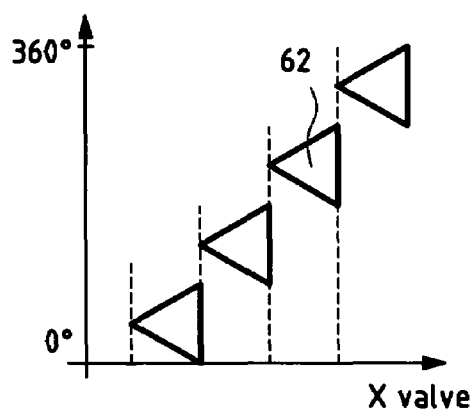
Figure 4B:
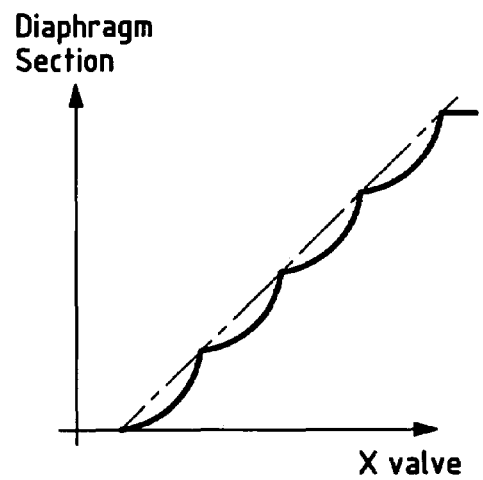
Figure 5A:
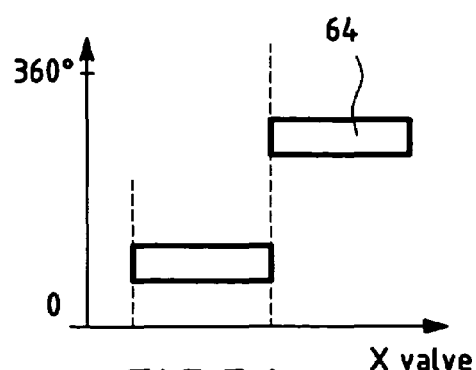
Figure 5B:
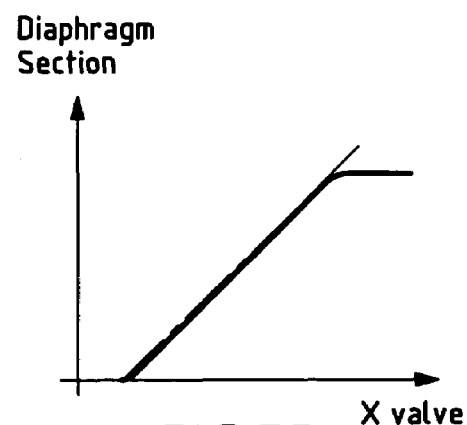
Figure 6:
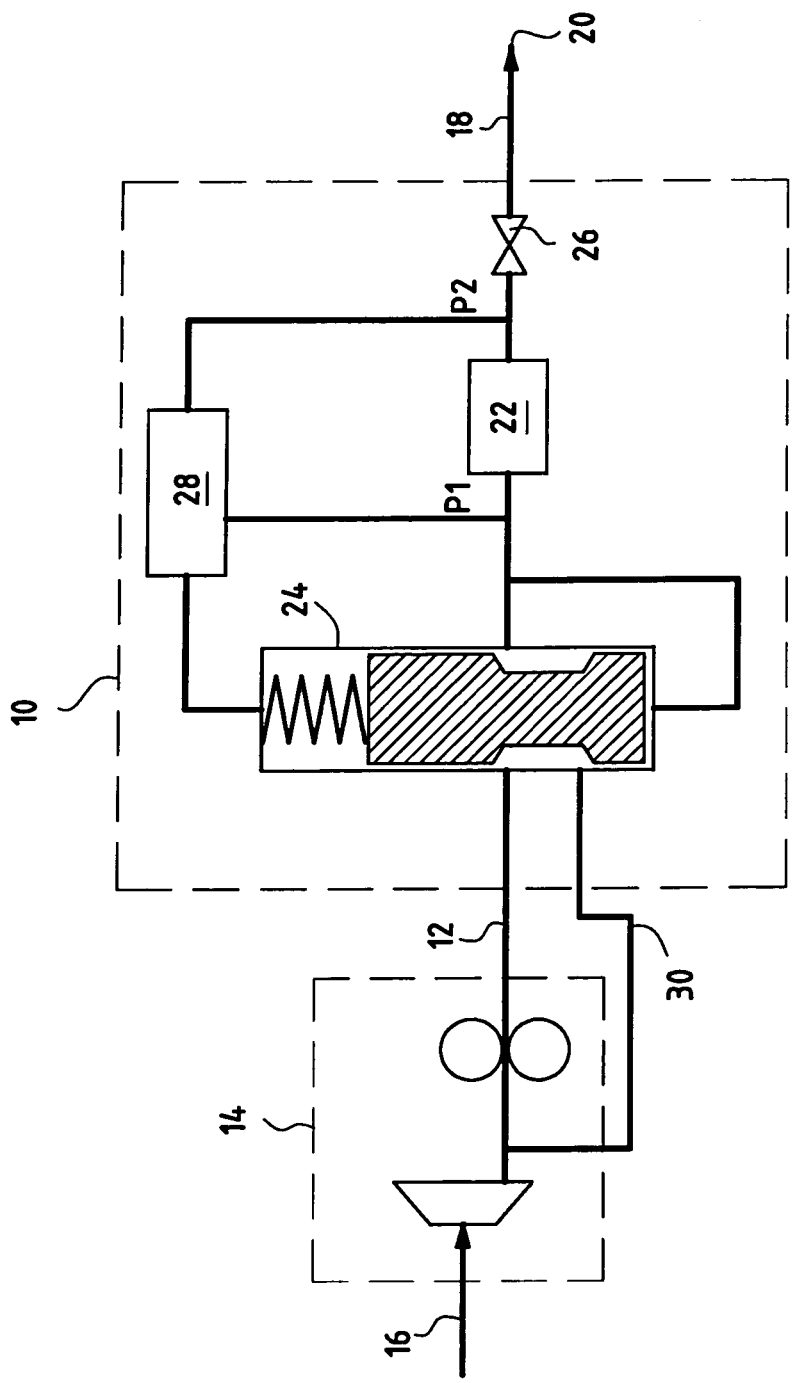
FIG. 6 is a diagrammatic view of a prior art fuel injection system.

FIGS. 3A, 4A, and 5A show three possible embodiments of orifices presenting three different shapes of section, and FIGS. 3B, 4B, and 5B are graphs plotting corresponding curves of fuel flow rate distribution through the outlet duct 50 as a function of valve position, the dashed line curves representing the optimum relationship for compensating variations in the position of the valve created by the above-defined parasitic phenomena.

In FIG. 3A, the variable diaphragm Kb comprises three circular holes 60 distributed regularly over the 360° of the periphery of the sheath and offset from one another by a distance corresponding substantially to half a diameter. In FIG. 4A, the variable diaphragm Kb has four orifices of triangular section 62 distributed regularly over the 360° of the periphery of the sheath and offset from one another, with the vertex of a triangle coinciding with the base of the preceding triangle. In FIG. 5A, the variable diaphragm Kb comprises two slots of rectangular section 64 regularly distributed over the 360° of the periphery of the sheath and offset from each other by the length of the slot.

The normal operation of the injection system is as follows. Conventionally, the unbalance in pressures applied to the two ends 36A and 36B causing a hydraulic slide 36 of the regulator valve 34 to move gives rise to an increase or a decrease in the flow rate of the recirculated fuel. Thus, when the pressure P1 at the inlet to the meter 22 increases, this increase acts on the end 36A of the hydraulic slide causing the slide to move upwards (in the figure), thereby enlarging the flow section corresponding to the return duct 30. The recirculated flow rate increases and the pressure P1 decreases while keeping the pressure difference ΔP constant. Similarly, when the pressure P2 at the outlet from the meter 22 increases, this increase acts on the end 36B of the hydraulic slide causing the slide to move downwards (in the drawing) and thus giving rise to a smaller flow section corresponding to the return duct 30. The recirculated flow rate thus decreases and the pressure P1 increases, while likewise maintaining the pressure difference ΔP constant.

Nevertheless, the pressure difference ΔP obtained after the valve has moved is not exactly the same since the spring stiffness and the reaction forces acting on slide equilibrium need to be added thereto. Thus, as the valve alternately opens and closes, the resulting pressure difference ΔP is in fact the initial pressure difference ΔP plus or minus a certain amount of error due to the above-mentioned parasitic effects.

However, with the invention, when the valve opens, Kb increases and the pressure (Pm) which is applied on the difference in sectional area (S1–S2) then decreases so as to compensate for the drift in forces, which increase and tend to close the valve.

Similarly, in the opposite circumstance, when the valve closes, Kb decreases so Pm increases, thereby compensating for the decrease in parasitic forces due to the valve closing.

Specifically, the configuration of the invention is particularly advantageous since high accuracy is obtained in the metering relationship while using a single variable diaphragm and a fixed diaphragm, it being possible to locate the fixed diaphragm either on the sheath of the regulator valve or outside it. In addition, the application of a modulated pressure to the differential section of the regulator valve is achieved very simply and at low cost by orifices that can have a wide variety of shapes (it is also possible to envisage having oblong holes, for example), thus making it possible to obtain a compensation relationship that is easily adjusted.

What is claimed is:

1. A fuel metering unit in a turbomachine, the unit being mounted between a high pressure pump which draws fuel from a fuel tank and a plurality of fuel injectors for injecting the fuel into a turbomachine combustion chamber, the unit comprising a meter which has an inlet receiving fuel for injection from a regulator valve at a pressure P1 and has an outlet which delivers the fuel at a pressure P2 to said plurality of injectors via a stop valve, said regulator valve comprising a hydraulic slide movable in a sheath under drive from the pressures P1 and P2 taken directly from the terminals of the meter and acting on two end inlets of said regulator valve on respective sectional areas S1 and S2 of the hydraulic slide, said slide having a first annular neck for allowing fuel to recirculate to said high pressure pump by puffing a first feed inlet of said sheath connected to an outlet of said high pressure pump into communication with a feed outlet of said sheath connected to an inlet of said high pressure pump, wherein said hydraulic slide further includes a second annular neck for providing another recirculation path to said high pressure pump by puffing a second feed inlet of said sheath connected to said inlet of the meter into communication with an auxiliary feed outlet of said sheath connected to said inlet of the high pressure pump.

2. A fuel metering unit according to claim 1, wherein said second feed inlet is connected to said inlet of the meter via a fixed diaphragm.

3. A fuel metering unit according to claim 2, wherein said fixed diaphragm has an orifice either pierced through said sheath or else made outside said regulator valve.

4. A fuel metering unit according to claim 1, wherein said auxiliary feed outlet is connected to said inlet of the high pressure pump via a variable diaphragm.

5. A fuel metering unit according to claim 4, wherein said variable diaphragm comprises a plurality of orifices of identical shape distributed in equidistant manner around said sheath through which they are pierced and offset from one another in the travel direction of said regulator valve.

6. A fuel metering unit according to claim 5, wherein said orifices are of a section selected from the following sections: circular, rectangular, triangular, and oblong.

7. A fuel metering unit according to claim 6, wherein said orifices are made by electroerosion.

* * * * *